(12) United States Patent
Leeder et al.

(10) Patent No.: US 10,080,118 B2
(45) Date of Patent: Sep. 18, 2018

(54) METHODS, SYSTEMS, AND COMPUTER READABLE MEDIA FOR MANAGING ASSOCIATIONS BETWEEN USERS IN MULTIPLE OVER-THE-TOP SERVICE PLATFORMS

(75) Inventors: Michael Leeder, Stittsville (CA); Carroll Louise Gray-Preston, Morrisville, NC (US); James Angus McEachern, Stittsville (CA); Richard C. Taylor, Manotick (CA)

(73) Assignee: GENBAND US LLC, Plano, TX (US)

( * ) Notice: Subject to any disclaimer, the term of this patent is extended or adjusted under 35 U.S.C. 154(b) by 948 days.

(21) Appl. No.: 13/206,111

(22) Filed: Aug. 9, 2011

(65) Prior Publication Data

US 2013/0040633 A1 Feb. 14, 2013

(51) Int. Cl.
*G06F 15/16* (2006.01)
*H04W 4/60* (2018.01)
*H04W 4/21* (2018.01)

(52) U.S. Cl.
CPC .............. *H04W 4/60* (2018.02); *H04W 4/21* (2018.02)

(58) Field of Classification Search
CPC ... H04L 29/08144; H04L 51/10; H04L 51/18; H04L 51/32
USPC ........................................................ 709/204
See application file for complete search history.

(56) References Cited

U.S. PATENT DOCUMENTS

| 2005/0125541 | A1* | 6/2005 | Frank et al. ............... 709/227 |
| 2010/0167732 | A1* | 7/2010 | Vakil ..................... H04W 60/00 455/435.1 |
| 2011/0208814 | A1* | 8/2011 | Bostrom ................ G06Q 10/10 709/204 |
| 2011/0276624 | A1* | 11/2011 | Akhtar ................... G06Q 10/10 709/203 |

* cited by examiner

*Primary Examiner* — Wing F Chan
*Assistant Examiner* — Andrew Woo
(74) *Attorney, Agent, or Firm* — Fogarty LLP

(57) ABSTRACT

According to one aspect, the subject matter described herein includes a method for managing associations between users in multiple over-the-top (OTT) service platforms. The method includes receiving a first message indicating an action associated with a first user in a first OTT service platform. The method also includes generating, based on the first message, a second message for performing a related action in a second OTT service platform. The method further includes communicating the second message to the second OTT service platform.

54 Claims, 14 Drawing Sheets

METHODS, SYSTEMS, AND COMPUTER READABLE MEDIA FOR MANAGING ASSOCIATIONS BETWEEN USERS IN MULTIPLE OVER-THE-TOP SERVICE PLATFORMS

TECHNICAL FIELD

The subject matter described herein relates to managing associations between users in multiple over-the-top (OTT) service platforms. More specifically, the subject matter relates to methods, systems, and computer readable media for managing associations between users in multiple OTT service platforms.

BACKGROUND

Modern telecommunications networks offer users a vast array of options for connecting and interacting with one another. In addition to choices provided by telecommunications providers themselves, users can now utilize a variety of independently developed products and services that run "on top" of the infrastructure maintained by the telecommunications industry. These independently developed products and services are commonly referred to as over-the-top (OTT) services because they are not developed with a specific telecommunications provider's network in mind, but rather are designed to interconnect users via a provider-independent platform. One example of an OTT service is a social networking service. Other examples are described in detail below.

While the rise of OTT services has provided users with increased flexibility by allowing them to separate the manner in which they interact from their respective telecommunications providers, it has also presented new challenges to the telecommunications providers that maintain the networks over which OTT services run. For example, provider revenue models that charge based on the utilization of provider services (e.g., price per voice minute, price per text message) may be incompatible with OTT service platforms that utilize the provider's infrastructure to provide roughly equivalent services at "no cost" to the consumer (e.g., peer-to-peer voice services, instant messaging).

Despite the challenges presented to network providers by the rise in popularity of OTT services, the paradigm shift also presents telecommunications providers with new opportunities. Like other providers, OTT service providers are subject to the "network effect." As a result, OTT service providers are primarily concerned with expanding their user base and hesitant to develop functionality for interacting with other OTT service providers. Often OTT service providers limit their interoperability to assisting users in switching from a competing platform, i.e., by providing a new user with the option to import contact information from another OTT service platform. Unlike their OTT service provider counterparts, telecommunications providers are ideally situated between their end users and the intersection of these various OTT service platforms. From this vantage point telecommunications providers can distinguish themselves by developing and implementing functionality that leverages information from multiple OTT service platforms.

Accordingly, a need exists for methods, systems, and computer readable media for managing associations between users in multiple OTT service platforms.

SUMMARY

According to one aspect, the subject matter described herein includes a method for managing associations between users in multiple OTT service platforms. The method includes receiving a first message indicating an action associated with a first user in a first OTT service platform. The method also includes generating, based on the first message, a second message for performing a related action in a second OTT service platform. The method further includes communicating the second message to the second OTT service platform.

According to another aspect, the subject matter described herein includes a system for managing associations between users in multiple OTT service platforms. The system includes a communication interface. The system also includes a memory. The system further includes an OTT management module. The OTT management module is configured to receive, via the communication interface, a first message indicating an action associated with a first user in a first OTT service platform. The OTT management module is also configured to generate, based on the first message and information stored in the memory, a second message for performing a related action in a second OTT service platform. The OTT management module is further configured to communicate, via the communication interface, the second message to the second OTT service platform.

As used herein, the term "node" refers to a physical computing platform including one or more processors and memory.

As used herein, the terms "function" or "module" refer to software in combination with hardware (such as a processor) and/or firmware for implementing features described herein.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
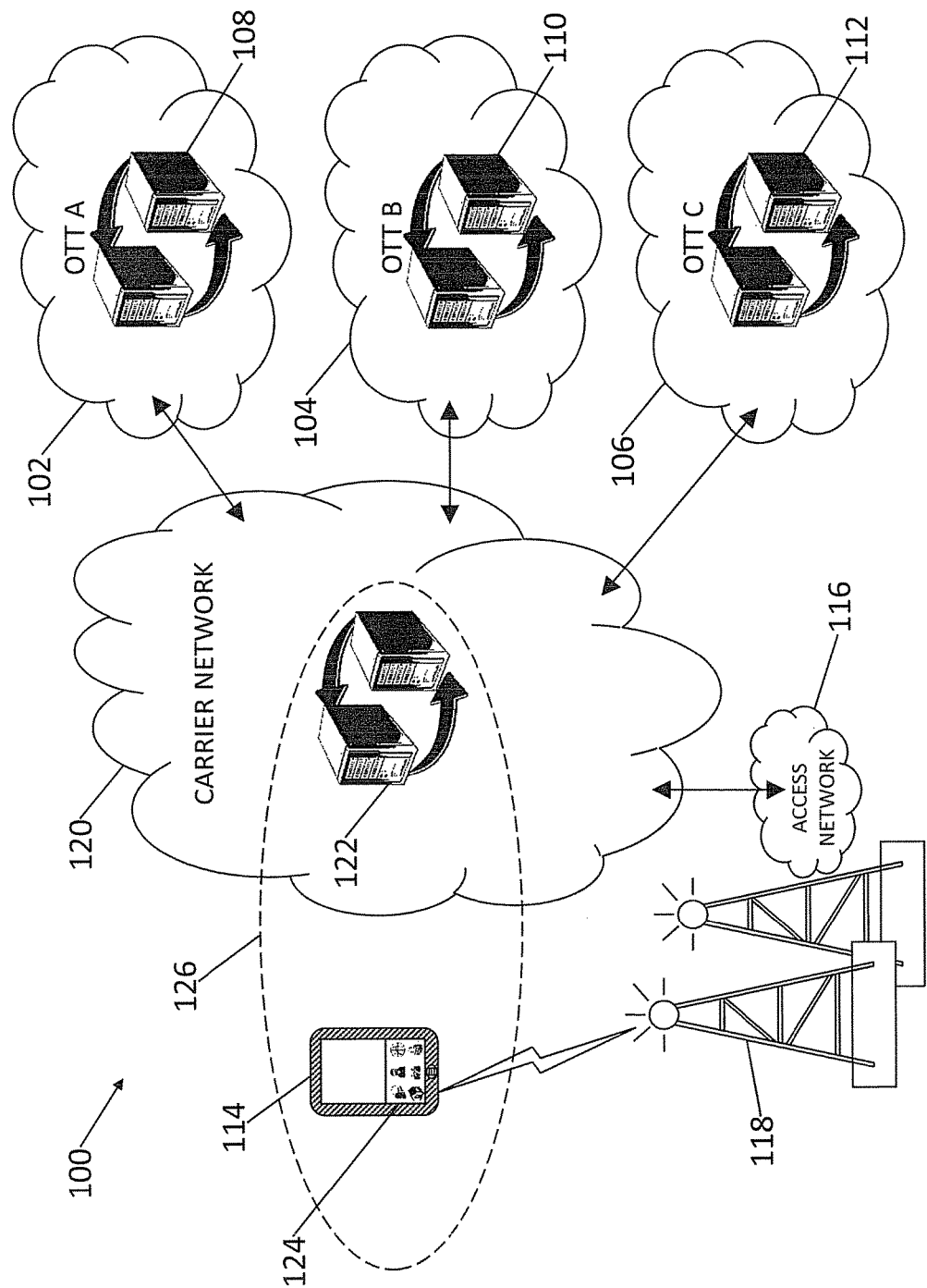
FIG. 1 is a network diagram illustrating an exemplary network environment for managing associations between users in multiple OTT service platforms in accordance with embodiments of the subject matter described herein.

Methods, systems, and computer readable media for managing associations between users in multiple OTT service platforms are provided. FIG. 1 is a network diagram illustrating an exemplary network environment for managing associations between users in multiple OTT service platforms in accordance with embodiments of the subject matter described herein. Referring to FIG. 1, network environment 100 may include one or more OTT service platforms. For example network environment 100 includes OTT service platform "A" 102, OTT service platform "B" 104, and OTT service platform "C" 106. An OTT service platform may include one or more network nodes that may work in conjunction with each other to provide various services to the platform's users. For example, OTT service platform "A" 102 may include one or more network nodes 108, OTT service platform "B" 104 may include one or more network nodes 110, and OTT service platform "C" 106 may include one or more network nodes 112. An OTT service platform may be any platform that offers services to users of different telecommunications providers independent of the particular telecommunications provider being utilized. For example, an OTT service platform may be a peer-to-peer voice over Internet protocol (VoIP) provider (e.g., Skype or Google Talk), an instant messaging service (e.g., America online instant messenger, Yahoo messenger, Google's Gchat), an email service (e.g., Google's Gmail), a social networking platform (e.g., Facebook, MySpace, Friendster, Twitter), or a really simple syndication (RSS) feed (e.g., an RSS feed provided by a news organization). Application of the subject matter described herein is not limited to these enumerated examples of OTT service platforms, but rather is applicable to any platform that offers services to users of different telecommunications providers independent of the particular telecommunications provider being utilized.

Network environment 100 may also include user equipment (UE), which may be any deice or combination of devices that enables a user to interact with one or more OTT service platforms and may include, for example, one or more mobile phones, personal computers, or tablet computers. For example, network environment 100 includes UE 114 which may enable a user of UE 114 to interact with one or more of OTT service platform "A" 102, OTT service platform "B" 104, and/or OTT service platform "C" 106. Depending on the particular hardware utilized and/or a user's location and preferences, a user may utilize one or more access and or carrier networks in interacting with one or more OTT service platforms. For example, a user utilizing a personal computer at their home or office may interact with an OTT service platform via a connection provided by an Internet service provider via a cable access network. Similarly, the same or another user utilizing a mobile phone may access the same or a different OTT service platform via a connection provided by a telecommunications provider via a cellular network. For example, UE 114 may utilize access network 116, via transceiver/receiver node 118, and/or carrier network 120 in order to interact with one or more of OTT service platform "A" 102, OTT service platform "B" 104, and/or OTT service platform "C" 106. Carrier network 120 may provide a vantage point for implementing functionality that leverages information from one or more OTT service platforms within those OTT service platforms or within one or more other OTT service platforms. For example, carrier network 120 may include one or more OTT service nodes 122 which in accordance with embodiments of the subject matter described herein may leverage information from one or more of OTT service platform "A" 102, OTT service platform "B" 104, and/or OTT service platform "C" 106 within one or more of OTT service platform "A" 102, OTT service platform "B" 104, and/or OTT service platform "C" 106.

In accordance with one embodiment of the subject matter described herein, a user of network environment 100 may be associated with one or more contact lists (not illustrated). For example, such a contact list and/or copies of such a contact list may be stored on UE 114, stored on OTT service node(s) 122, and/or stored on other nodes (not illustrated) that are accessible to UE 114, for example, via access network 116 and/or carrier network 120. UE 114 may provide a user with a GUI. For example UE 114 provides its user(s) with GUI 124. GUI 124 may include interfaces for managing information stored in such contact list(s). In embodiments that include multiple contact list copies, the nodes on which such contact lists are stored may be configured to sync with one another, for example, on a periodic or change-triggered basis. For example, if a copy of a contact list for a user of UE 114 was stored both on UE 114 (i.e., local copy) and on OTT service node(s) 122 (i.e., remote copy), UE 114 may be configured to periodically "sync" its copy with the copy stored on OTT service node(s) 122 and vice versa. Thus, if a change occurred in the copy stored on OTT service node(s) 122, the change would, in due course, be reflected in the copy stored on UE 114. In accordance with embodiments of the subject matter described herein, OTT service node(s) 122 may be configured to maintain and update such contact lists, immaterial of where such copies are stored, based on information gathered from one or more OTT service platforms, and the management of such information. For example, OTT services node (s) 122 may be configured to maintain and update a contact list associated with a user of UE 114, a copy or copies of which may be stored, for example, on UE 114 and/or OTT service node(s) 122, based on information gathered from one or more of OTT service platform "A" 102, OTT service platform "B" 104, and/or OTT service platform "C" 106, and/or the management of such information. In one embodiment OTT service node(s) 122 are distinct from UE 114. In an alternate embodiment, common network node 126 provides the functionality of OTT service node(s) 122 and UE 114. For example, the functionality of OTT service node(s) 122 may be implemented as one or more modules and/or services on UE 114, the module(s) and/or service(s) being able to communicate with one or more other modules and/or services running on UE 114, for example, module(s) and/or service(s) associated with managing a contact list and/or a copy of a contact list stored on UE 114.

Figure 2:
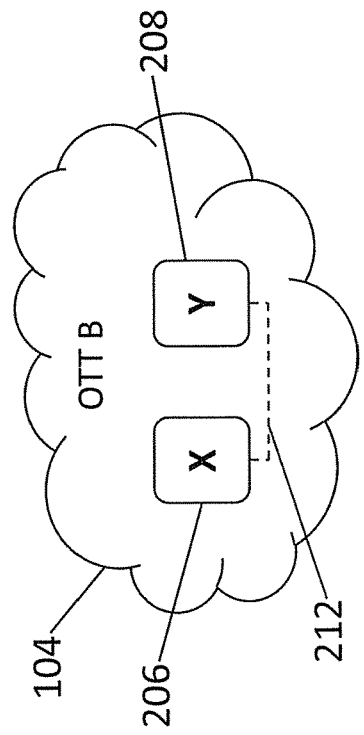
FIG. 2 is an entity-relationship diagram illustrating an exemplary scenario for managing associations between users in multiple OTT service platforms where an association is created between two users in a first OTT service platform and, in response, an association is created between the two users in a second OTT service platform in accordance with embodiments of the subject matter described herein.
Figure 2:
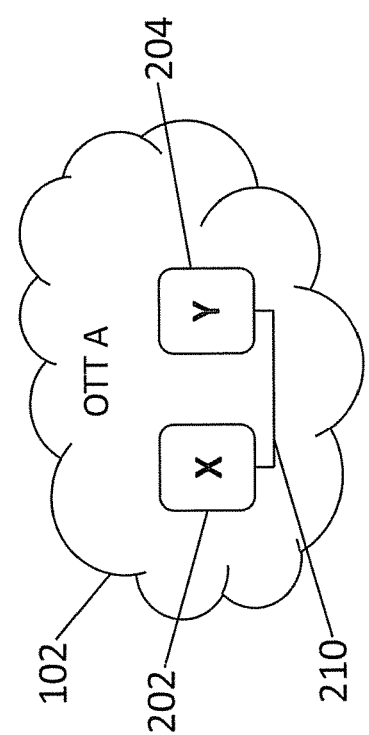

FIG. 2 is an entity-relationship diagram illustrating an exemplary scenario for managing associations between users in multiple OTT service platforms where an association is created between two users in a first OTT service platform and, in response, an association is created between the two users in a second OTT service platform in accordance with embodiments of the subject matter described herein. Referring to FIG. 2, each of OTT service platform "A" 102 and OTT service platform "B" 104 may include one or more user profiles associated with individual users of the respective OTT service platforms. For example, OTT service platform "A" 102 may include user profile "X" 202 and user profile "Y" 204. Similarly, OTT service platform "B" 104 may include user profile "X" 206 and user profile "Y" 208. User profile "X" 202 and user profile "X" 206 may be associated with a common user "X" (not illustrated) and may correspond to separate "profiles" or "accounts" respectively associated with OTT service platform "A" 102 and OTT service platform "B" 104. Similarly, user profile "Y" 204 and user profile "Y" 208 may be associated with a common user "Y" (not illustrated) and may correspond to separate "profiles" or "accounts" respectively associated with OTT service platform "A" 102 and OTT service platform "B" 104. Association 210 may be created in OTT service platform "A" 102 between user profile "X" 202 and user profile "Y" 204. For example, OTT service platform "A" 102 may correspond to Facebook and association 210 may correspond to a "friendship" between user profile "X" 202 and user profile "Y" 204.

In accordance with embodiments of the subject matter described herein, OTT service node(s) 122 may receive a message (not illustrated) indicating that association 210 has been created in OTT service platform "A" 102 between user profile "X" 202 and user profile "Y" 204. Based in part on the message indicating that association 210 has been created in OTT service platform "A" 102 between user profile "X" 202 and user profile "Y" 204, OTT service node(s) 122 may generate a message (not illustrated) for creating association 212 between user profile "X" 206 and user profile "Y" 208 in OTT service platform "B" 104. For example, OTT service platform "B" 104 may correspond to Twitter and association 212 may correspond to user profile "X" 206 "following" user profile "Y" 208. OTT service node(s) 122 may further communicate the message for creating association 212 between user profile "X" 206 and user profile "Y" 208 to OTT service platform "B" 104. Thus, OTT service node(s) 122 may leverage information from one OTT service platform (e.g., the creation of association 210 between user profile "X" 202 and user profile "Y" 204 in OTT service platform "A" 102) into a distinct OTT service platform (e.g., by communicating to OTT service platform "B" 104 a message for creating association 212 between user profile "X" 206 and user profile "Y" 208). In other words, for example, in response to a user "X" associated with user profile "X" 202 creating association 210 (e.g., "friending") with a user "Y" associated with user profile "Y" 204 in OTT service platform "A" 102 (e.g., Facebook), OTT service node(s) 122 may generate and communicate to OTT service platform "B" 104 (e.g., Twitter) a message for creating association 212 between user profile "X" 206 and user profile "Y" 208 in OTT service platform "B" 104 (e.g., having user "X" "follow" user "Y" and/or vice versa).

Figure 3:
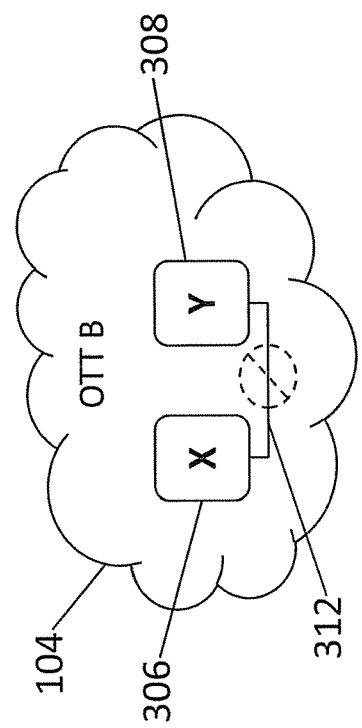
FIG. 3 is an entity-relationship diagram illustrating an exemplary scenario for managing associations between users in multiple OTT service platforms where two associated users in a first OTT service platform are disassociated and, in response, the two users are disassociated in a second OTT service platform in accordance with embodiments of the subject matter described herein.
Figure 3:
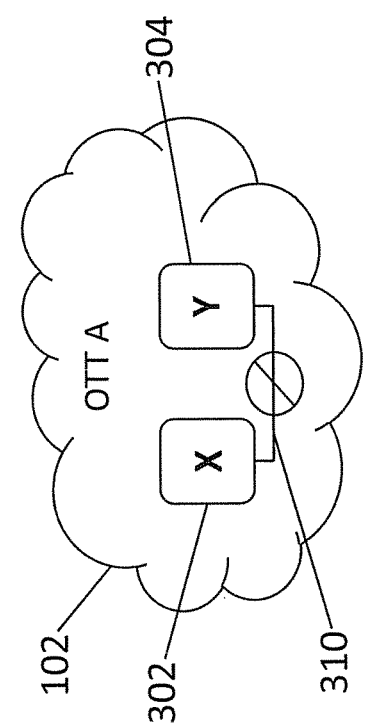

FIG. 3 is an entity-relationship diagram illustrating an exemplary scenario for managing associations between users in multiple OTT service platforms where two associated users in a first OTT service platform are disassociated and, in response, the two users are disassociated in a second OTT service platform in accordance with embodiments of the subject matter described herein. Referring to FIG. 3, each of OTT service platform "A" 102 and OTT service platform "B" 104 may include one or more user profiles associated with individual users of the respective OTT service platforms. For example, OTT service platform "A" 102 may include user profile "X" 302 and user profile "Y" 304. Similarly, OTT service platform "B" 104 may include user profile "X" 306 and user profile "Y" 308. User profile "X" 302 and user profile "X" 306 may be associated with a common user "X" (not illustrated) and may correspond to separate "profiles" or "accounts" respectively associated with OTT service platform "A" 102 and OTT service platform "B" 104. Similarly, user profile "Y" 304 and user profile "Y" 308 may be associated with a common user "Y" (not illustrated) and may correspond to separate "profiles" or "accounts" respectively associated with OTT service platform "A" 102 and OTT service platform "B" 104. Association 310 may exist between user profile "X" 302 and user profile "Y" 304 in OTT service platform "A" 102. For example, OTT service platform "A" 102 may correspond to Facebook and association 310 may correspond to a "friendship" between user profile "X" 302 and user profile "Y" 304. Similarly, association 312 may exist between user profile "X" 306 and user profile "Y" 308 in OTT service platform "B" 104. For example, OTT service platform "B" 104 may correspond to Twitter and association 312 may correspond to user profile "X" 306 "following" user profile "Y" 308 and/or vice versa. One or both of the users respectively associated with user profile "X" 302 and user profile "Y" 304 may choose to disassociate with one another in OTT service platform "A" 102; destroying association 310. For example, OTT service platform "A" 102 may correspond to Facebook, association 310 may correspond to a "friendship" between user profile "X" 302 and user profile "Y" 304, and one or both of the users respectively associated with user profile "X" 302 and user profile "Y" 304 may choose to "unfriend" with one another in OTT service platform "A" 102; destroying association 310.

In accordance with embodiments of the subject matter described herein, OTT service node(s) 122 may receive a message (not illustrated) indicating that association 310 has been destroyed in OTT service platform "A" 102 between user profile "X" 302 and user profile "Y" 304. Based in part on the message indicating that association 310 has been destroyed in OTT service platform "A" 102 between user profile "X" 302 and user profile "Y" 304, OTT service node(s) 122 may generate a message (not illustrated) for destroying association 312 between user profile "X" 306 and user profile "Y" 308 in OTT service platform "B" 104. OTT service node(s) 122 may further communicate the message for destroying association 312 between user profile "X" 306 and user profile "Y" 308 to OTT service platform "B" 104. Thus, OTT service node(s) 122 may leverage information from one OTT service platform (e.g., the destruction of association 310 between user profile "X" 302 and user profile "Y" 304 in OTT service platform "A" 102) into a distinct OTT service platform (e.g., by communicating to OTT service platform "B" 104 a message for destroying association 312 between user profile "X" 306 and user profile "Y" 308). In other words, for example, in response to a user "X" associated with user profile "X" 302 destroying association 310 (e.g., "unfriending") with a user "Y" associated with user profile "Y" 304 in OTT service platform "A" 102 (e.g., Facebook), OTT service node(s) 122 may generate and communicate to OTT service platform "B" 104 (e.g., Twitter) a message for destroying association 312 between user profile "X" 306 and user profile "Y" 308 in OTT service platform "B" 104 (e.g., having user "X" stop "following" user "Y" and/or vice versa).

Figure 4:
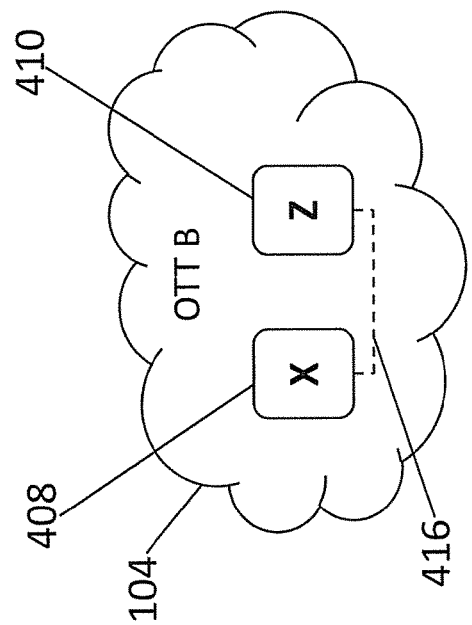
FIG. 4 is an entity-relationship diagram illustrating an exemplary scenario for managing associations between users in multiple OTT service platforms where two users are associated in a first OTT service platform, an association is created between one of the two users and a third user in the first OTT service platform, and, in response, an association is created between the other of the two users and the third user in a second OTT service platform in accordance with embodiments of the subject matter described herein.
Figure 4:
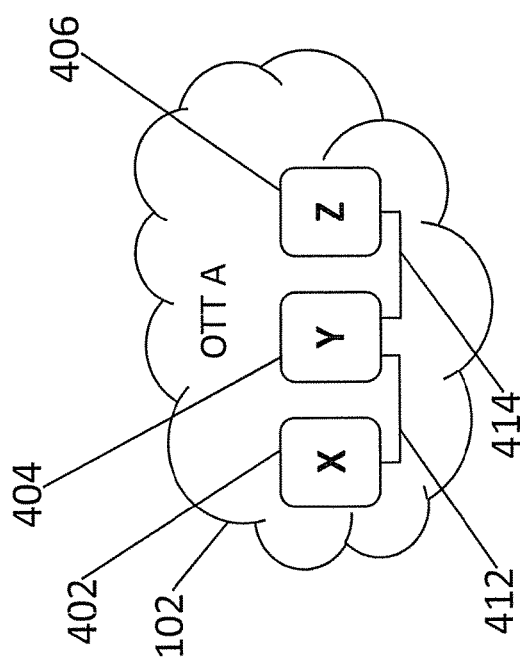

FIG. 4 is an entity-relationship diagram illustrating an exemplary scenario for managing associations between users in multiple OTT service platforms where two users are associated in a first OTT service platform, an association is created between one of the two users and a third user in the first OTT service platform, and, in response, an association is created between the other of the two users and the third user in a second OTT service platform in accordance with embodiments of the subject matter described herein. Referring to FIG. 4, each of OTT service platform "A" 102 and OTT service platform "B" 104 may include one or more user profiles associated with individual users of the respective OTT service platforms. For example, OTT service platform "A" 102 may include user profile "X" 402, user profile "Y" 404, and user profile "Z" 406. Similarly, OTT service platform "B" 104 may include user profile "X" 408 and user profile "Z" 410. User profile "X" 402 and user profile "X" 408 may be associated with a common user "X" (not illustrated) and may correspond to separate "profiles" or "accounts" respectively associated with OTT service platform "A" 102 and OTT service platform "B" 104. Similarly, user profile "Z" 406 and user profile "Z" 410 may be associated with a common user "Z" (not illustrated) and may correspond to separate "profiles" or "accounts" respectively associated with OTT service platform "A" 102 and OTT service platform "B" 104. Association 412 may exist between user profile "X" 402 and user profile "Y" 404 in OTT service platform "A" 102. For example, OTT service platform "A" 102 may correspond to Facebook and association 412 may correspond to a "friendship" between user profile "X" 402 and user profile "Y" 404. Association 414 may be created in OTT service platform "A" 102 between user profile "Y" 404 and user profile "Z" 406. For example, OTT service platform "A" 102 may correspond to Facebook and association 414 may correspond to a "friendship" between user profile "Y" 404 and user profile "Z" 406.

In accordance with embodiments of the subject matter described herein, OTT service node(s) 122 may receive a message (not illustrated) indicating that association 414 has been created in OTT service platform "A" 102 between user profile "Y" 404 and user profile "Z" 406. Based in part on the message indicating that association 414 has been created in OTT service platform "A" 102 between user profile "Y" 404 and user profile "Z" 406, OTT service node(s) 122 may generate a message (not illustrated) for creating association 416 between user profile "X" 408 and user profile "Z" 410 in OTT service platform "B" 104. For example, OTT service platform "B" 104 may correspond to Twitter and association 416 may correspond to user profile "X" 408 "following" user profile "Z" 410. OTT service node(s) 122 may further communicate the message for creating association 416 between user profile "X" 408 and user profile "Z" 410 to OTT service platform "B" 104. Thus, OTT service node(s) 122 may leverage information from one OTT service platform (e.g., the creation of association 414 between user profile "Y" 404 and user profile "Z" 406 in OTT service platform "A" 102, in light of association 412 between user profile "X" 402 and user profile "Y" 404 in OTT service platform "A" 102) into a distinct OTT service platform (e.g., by communicating to OTT service platform "B" 104 a message for creating association 416 between user profile "X" 408 and user profile "Z" 410). In other words, for example, in response to a user "Y" associated with user profile "Y" 404, having association 412 with a user "X" associated with user profile "X" 402 in OTT service platform "A" 102 (e.g., having a "friendship" with user "X"), creating association 414 (e.g., "friending") with a user "Z" associated with user profile "Z" 406 in OTT service platform "A" 102 (e.g., Facebook), OTT service node(s) 122 may generate and communicate to OTT service platform "B" 104 (e.g., Twitter) a message for creating association 416 between user profile "X" 408 and user profile "Z" 410 in OTT service platform "B" 104 (e.g., having user "X" "follow" in Twitter his/her Facebook "friend's friend," user "Z," and/or vice versa).

Figure 5:
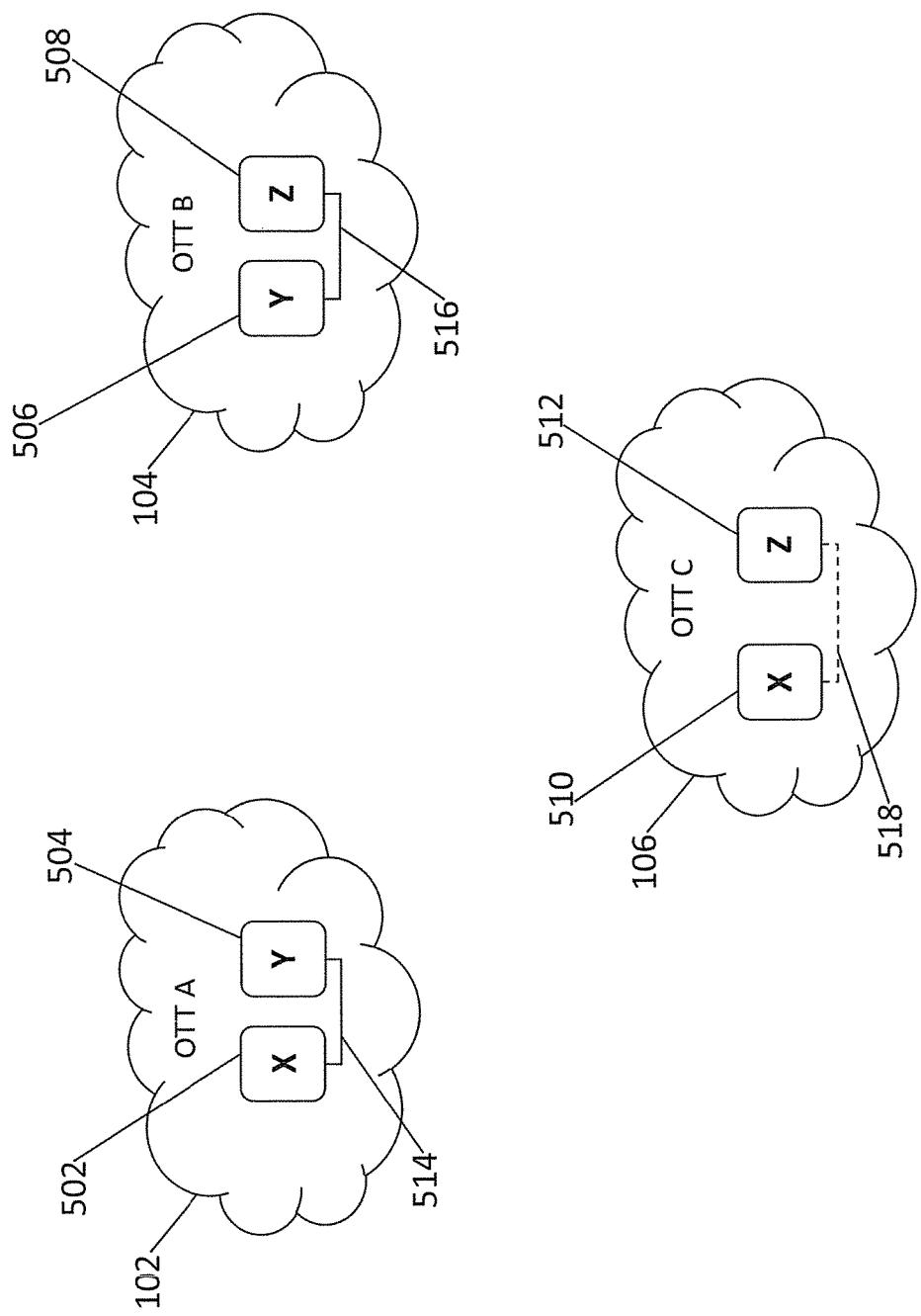
FIG. 5 is an entity-relationship diagram illustrating an exemplary scenario for managing associations between users in multiple OTT service platforms where two users are associated in a first OTT service platform, an association is created between one of the two users and a third user in a second OTT service platform, and, in response, an association is created between the other of the two users and the third user in a third OTT service platform in accordance with embodiments of the subject matter described herein.

FIG. 5 is an entity-relationship diagram illustrating an exemplary scenario for managing associations between users in multiple OTT service platforms where two users are associated in a first OTT service platform, an association is created between one of the two users and a third user in a second OTT service platform, and, in response, an association is created between the other of the two users and the third user in a third OTT service platform in accordance with embodiments of the subject matter described herein. Referring to FIG. 5, each of OTT service platform "A" 102, OTT service platform "B" 104, and OTT service platform "C" 106 may include one or more user profiles associated with individual users of the respective OTT service platforms. For example, OTT service platform "A" 102 may include user profile "X" 502 and user profile "Y" 504. Similarly, OTT service platform "B" 104 may include user profile "Y" 506 and user profile "Z" 508, and OTT service platform "C" 106 may include user profile "X" 510 and user profile "Z" 512. User profile "X" 502 and user profile "X" 510 may be associated with a common user "X" (not illustrated) and may correspond to separate "profiles" or "accounts" respectively associated with OTT service platform "A" 102 and OTT service platform "C" 106. Similarly, user profile "Y" 504 and user profile "Y" 506 may be associated with a common user "Y" (not illustrated) and may correspond to separate "profiles" or "accounts" respectively associated with OTT service platform "A" 102 and OTT service platform "B" 104, and user profile "Z" 508 and user profile "Z" 512 may be associated with a common user "Z" (not illustrated) and may correspond to separate "profiles" or "accounts" respectively associated with OTT service platform "B" 104 and OTT service platform "C" 106. Association 514 may exist between user profile "X" 502 and user profile "Y" 504 in OTT service platform "A" 102. For example, OTT service platform "A" 102 may correspond to Facebook and association 514 may correspond to a "friendship" between user profile "X" 502 and user profile "Y" 504. Association 516 may be created in OTT service platform "B" 104 between user profile "Y" 506 and user profile "Z" 508. For example, OTT service platform "B" 104 may correspond to Yahoo messenger and association 516 may correspond to an entry associated with user "Z" stored in a contact list associated with user profile "Y" 506 and/or an entry associated with user "Y" stored in a contact list associated with user profile "Z" 508.

In accordance with embodiments of the subject matter described herein, OTT service node(s) 122 may receive a message (not illustrated) indicating that association 516 has been created in OTT service platform "B" 104 between user profile "Y" 506 and user profile "Z" 508. Based in part on the message indicating that association 516 has been created in OTT service platform "B" 104 between user profile "Y" 506 and user profile "Z" 508, OTT service node(s) 122 may generate a message (not illustrated) for creating association 518 between user profile "X" 510 and user profile "Z" 512 in OTT service platform "C" 106. For example, OTT service platform "C" 106 may correspond to Twitter and association 518 may correspond to user profile "X" 510 "following" user profile "Z" 512. OTT service node(s) 122 may further communicate the message for creating association 518 between user profile "X" 510 and user profile "Z" 512 to OTT service platform "C" 106. Thus, OTT service node(s) 122 may leverage information from two OTT service platforms (e.g., the creation of association 516 between user profile "Y" 506 and user profile "Z" 508 in OTT service platform "B" 104 and the existence of association 514 between user profile "X" 502 and user profile "Y" 504 in OTT service platform "A" 102) into a distinct OTT service platform (e.g., by communicating to OTT service platform "C" 106 a message for creating association 518 between user profile "X" 510 and user profile "Z" 512). In other words, for example, in response to a user "Y" associated with user profile "Y" 504, having association 514 with a user "X" associated with user profile "X" 502 in OTT service platform "A" 102 (e.g., having a "friendship" with user "X"), creating association 516 (e.g., adding an entry to their Yahoo messenger contact list) with a user "Z" associated with user profile "Z" 508 in OTT service platform "B" 104 (e.g., Yahoo messenger), OTT service node(s) 122 may generate and communicate to OTT service platform "C" 106 (e.g., Twitter) a message for creating association 518 between user profile "X" 510 and user profile "Z" 512 in OTT service platform "C" 106 (e.g., having user "X" "follow" in Twitter his/her "friend's Yahoo messenger contact," user "Z," and/or vice versa).

Figure 6:
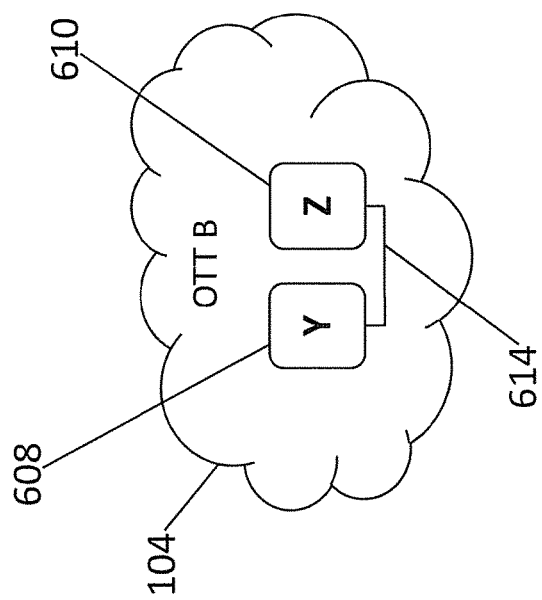
FIG. 6 is an entity-relationship diagram illustrating an exemplary scenario for managing associations between users in multiple OTT service platforms where two users are associated in a first OTT service platform, an association is created between one of the two users and a third user in a second OTT service platform, and, in response, an association is created between the other of the two users and the third user in the first OTT service platform in accordance with embodiments of the subject matter described herein.
Figure 6:
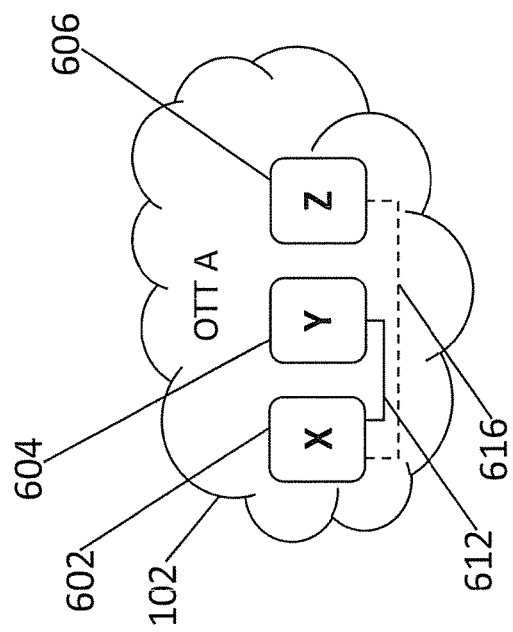

FIG. 6 is an entity-relationship diagram illustrating an exemplary scenario for managing associations between users in multiple OTT service platforms where two users are associated in a first OTT service platform, an association is created between one of the two users and a third user in a second OTT service platform, and, in response, an association is created between the other of the two users and the third user in the first OTT service platform in accordance with embodiments of the subject matter described herein. Referring to FIG. 6, each of OTT service platform "A" 102 and OTT service platform "B" 104 may include one or more user profiles associated with individual users of the respective OTT service platforms. For example, OTT service platform "A" 102 may include user profile "X" 602, user profile "Y" 604, and user profile "Z" 606. Similarly, OTT service platform "B" 104 may include user profile "Y" 608 and user profile "Z" 610. User profile "Y" 604 and user profile "Y" 608 may be associated with a common user "Y" (not illustrated) and may correspond to separate "profiles" or "accounts" respectively associated with OTT service platform "A" 102 and OTT service platform "B" 104. Similarly, user profile "Z" 606 and user profile "Z" 610 may be associated with a common user "Z" (not illustrated) and may correspond to separate "profiles" or "accounts" respectively associated with OTT service platform "A" 102 and OTT service platform "B" 104. Association 612 may exist between user profile "X" 602 and user profile "Y" 604 in OTT service platform "A" 102. For example, OTT service platform "A" 102 may correspond to Facebook and association 612 may correspond to a "friendship" between user profile "X" 602 and user profile "Y" 604. Association 614 may be created in OTT service platform "B" 104 between user profile "Y" 608 and user profile "Z" 610. For example, OTT service platform "B" 104 may correspond to Twitter and association 614 may correspond to user profile "Y" 608 "following" user profile "Z" 610 and/or vice versa.

In accordance with embodiments of the subject matter described herein, OTT service node(s) 122 may receive a message (not illustrated) indicating that association 614 has been created in OTT service platform "B" 104 between user profile "Y" 608 and user profile "Z" 610. Based in part on the message indicating that association 614 has been created in OTT service platform "B" 104 between user profile "Y" 608 and user profile "Z" 610, OTT service node(s) 122 may generate a message (not illustrated) for creating association 616 between user profile "X" 602 and user profile "Z" 606 in OTT service platform "A" 102. For example, OTT service platform "A" 102 may correspond to Facebook and association 616 may correspond to a "friendship" between user profile "X" 602 and user profile "Z" 606. OTT service node(s) 122 may further communicate the message for creating association 616 between user profile "X" 602 and user profile "Z" 606 to OTT service platform "A" 102. Thus, OTT service node(s) 122 may leverage information from one OTT service platform (e.g., the creation of association 614 between user profile "Y" 608 and user profile "Z" 610 in OTT service platform "B" 104, in light of association 612 between user profile "X" 602 and user profile "Y" 604 in OTT service platform "A" 102) into a distinct OTT service platform (e.g., by communicating to OTT service platform "A" 102 a message for creating association 616 between user profile "X" 602 and user profile "Z" 606). In other words, for example, in response to a user "Y" associated with user profile "Y" 604, having association 612 with a user "X" associated with user profile "X" 602 in OTT service platform "A" 102 (e.g., having a "friendship" with user "X"), creating association 614 (e.g., "following") with a user "Z" associated with user profile "Z" 610 in OTT service platform "B" 104 (e.g., Twitter), OTT service node(s) 122 may generate and communicate to OTT service platform "A" 102 (e.g., Facebook) a message for creating association 616 between user profile "X" 602 and user profile "Z" 606 in OTT service platform "A" 102 (e.g., having user "X" "friend" in Facebook a user that his/her Facebook "friend" "follows" in Twitter).

Figure 7:
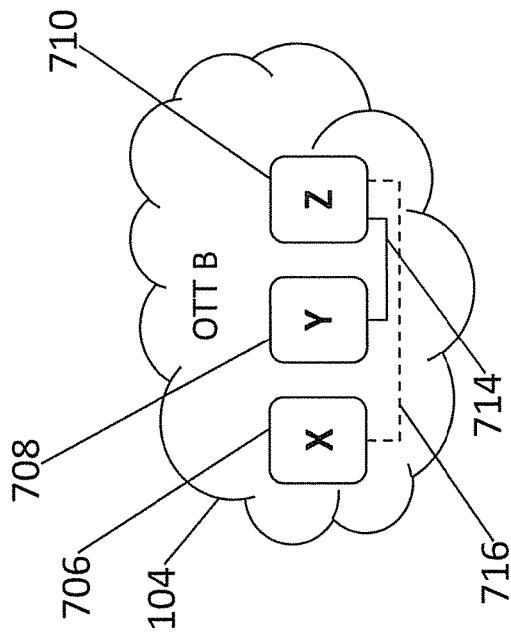
FIG. 7 is an entity-relationship diagram illustrating an exemplary scenario for managing associations between users in multiple OTT service platforms where two users are associated in a first OTT service platform, an association is created between one of the two users and a third user in a second OTT service platform, and, in response, an association is created between the other of the two users and the third user in the second OTT service platform in accordance with embodiments of the subject matter described herein.
Figure 7:
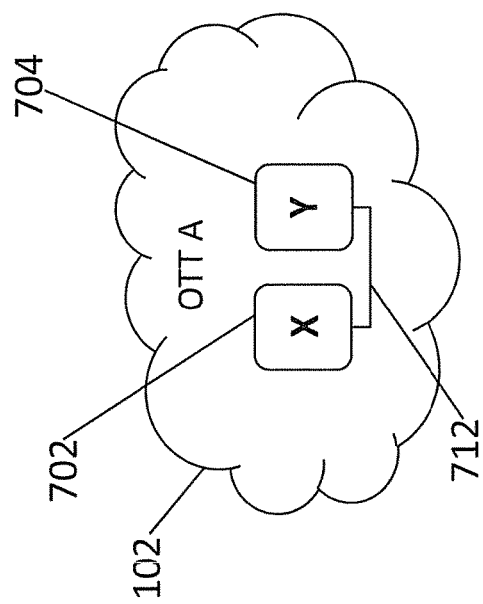

FIG. 7 is an entity-relationship diagram illustrating an exemplary scenario for managing associations between users in multiple OTT service platforms where two users are associated in a first OTT service platform, an association is created between one of the two users and a third user in a second OTT service platform, and, in response, an association is created between the other of the two users and the third user in the second OTT service platform in accordance with embodiments of the subject matter described herein. Referring to FIG. 7, each of OTT service platform "A" 102 and OTT service platform "B" 104 may include one or more user profiles associated with individual users of the respective OTT service platforms. For example, OTT service platform "A" 102 may include user profile "X" 702 and user profile "Y" 704. Similarly, OTT service platform "B" 104 may include user profile "X" 706, user profile "Y" 708, and user profile "Z" 710. User profile "X" 702 and user profile "X" 706 may be associated with a common user "X" (not illustrated) and may correspond to separate "profiles" or "accounts" respectively associated with OTT service platform "A" 102 and OTT service platform "B" 104. Similarly, user profile "Y" 704 and user profile "Y" 708 may be associated with a common user "Y" (not illustrated) and may correspond to separate "profiles" or "accounts" respectively associated with OTT service platform "A" 102 and OTT service platform "B" 104. Association 712 may exist between user profile "X" 702 and user profile "Y" 704 in OTT service platform "A" 102. For example, OTT service platform "A" 102 may correspond to Facebook and association 712 may correspond to a "friendship" between user profile "X" 702 and user profile "Y" 704. Association 714 may be created in OTT service platform "B" 104 between user profile "Y" 708 and user profile "Z" 710. For example, OTT service platform "B" 104 may correspond to Twitter and association 714 may correspond to user profile "Y" 708 "following" user profile "Z" 710 and/or vice versa.

In accordance with embodiments of the subject matter described herein, OTT service node(s) 122 may receive a message (not illustrated) indicating that association 714 has been created in OTT service platform "B" 104 between user profile "Y" 708 and user profile "Z" 710. Based in part on the message indicating that association 714 has been created in OTT service platform "B" 104 between user profile "Y" 708 and user profile "Z" 710, OTT service node(s) 122 may generate a message (not illustrated) for creating association 716 between user profile "X" 706 and user profile "Z" 710 in OTT service platform "B" 104. For example, OTT service platform "B" 104 may correspond to Twitter and association 716 may correspond to user profile "X" 706 "following" user profile "Z" 710 and/or vice versa. OTT service node(s) 122 may further communicate the message for creating association 716 between user profile "X" 706 and user profile "Z" 710 to OTT service platform "B" 104. Thus, OTT service node(s) 122 may leverage information from one OTT service platform (e.g., association 712 between user profile "X" 702 and user profile "Y" 704 in OTT service platform "A" 102, in light of the creation of association 714 between user profile "Y" 708 and user profile "Z" 710 in OTT service platform "B" 104) into a distinct OTT service platform (e.g., by communicating to OTT service platform "B" 104 a message for creating association 716 between user profile "X" 706 and user profile "Z" 710). In other words, for example, in response to a user "Y" associated with user profile "Y" 704, having association 712 with a user "X" associated with user profile "X" 702 in OTT service platform "A" 102 (e.g., having a "friendship" with user "X"), creating association 714 (e.g., "following") with a user "Z" associated with user profile "Z" 710 in OTT service platform "B" 104 (e.g., Twitter), OTT service node(s) 122 may generate and communicate to OTT service platform "B" 104 (e.g., Twitter) a message for creating association 716 between user profile "X" 706 and user profile "Z" 710 in OTT service platform "B" 104 (e.g., having user "X" "follow" a user that his/her Facebook "friend" "follows" in Twitter).

Figure 8:
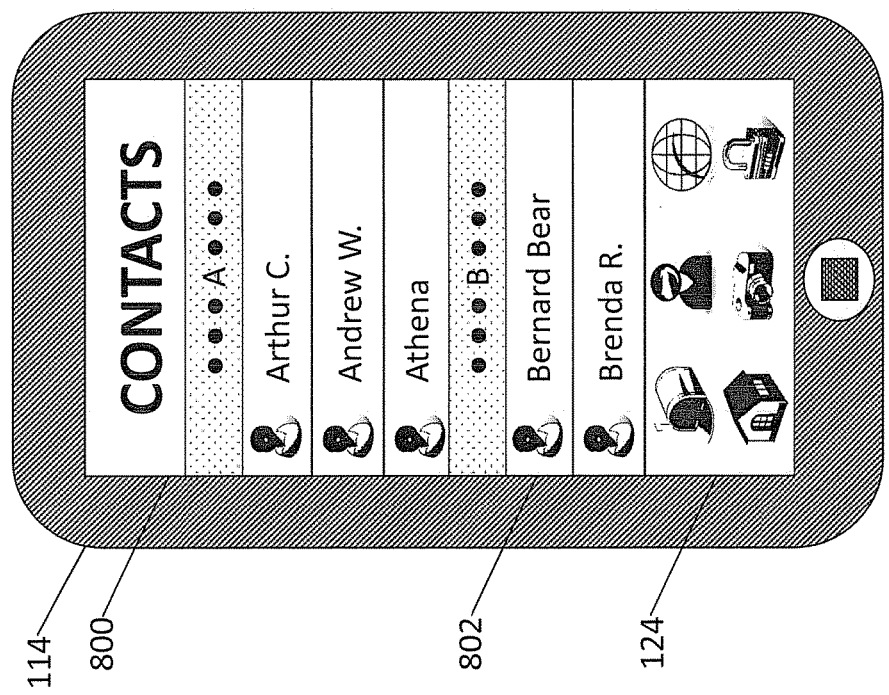
FIG. 8 is a diagram illustrating a contact list view of an exemplary graphical user interface (GUI) for managing associations between users in multiple OTT service platforms in accordance with embodiments of the subject matter described herein.

FIG. 8 is a diagram illustrating a contact list view of an exemplary GUI for managing associations between users in multiple OTT service platforms in accordance with embodiments of the subject matter described herein. Referring to FIG. 8, a user of UE 114 may be associated with one or more contact lists. A contact list and/or a copy of such a contact list may be stored on UE 114. UE 114 may provide a user with GUI 124. GUI 124 may include contact management interface 800 for managing information stored in such contact list(s). Such contact list(s) may include one or more entries corresponding to people or organizations with which a user of UE 114 may be associated. Entries in such contact list(s) may be created, for example, by a user of UE 114 via contact management interface 800, and/or may be derived by aggregating information from one or more OTT service platforms. For example, such contact list(s) may be derived by aggregating information from one or more of OTT service platform "A" 102, OTT service platform "B" 104, and/or OTT service platform "C" 106. Contact management interface 800 may display one or more contact entries corresponding to entries in such contact list(s). For example, contact management interface 800 may display contact entry 802 corresponding to an individual known as "Bernard Bear."

Figure 9:
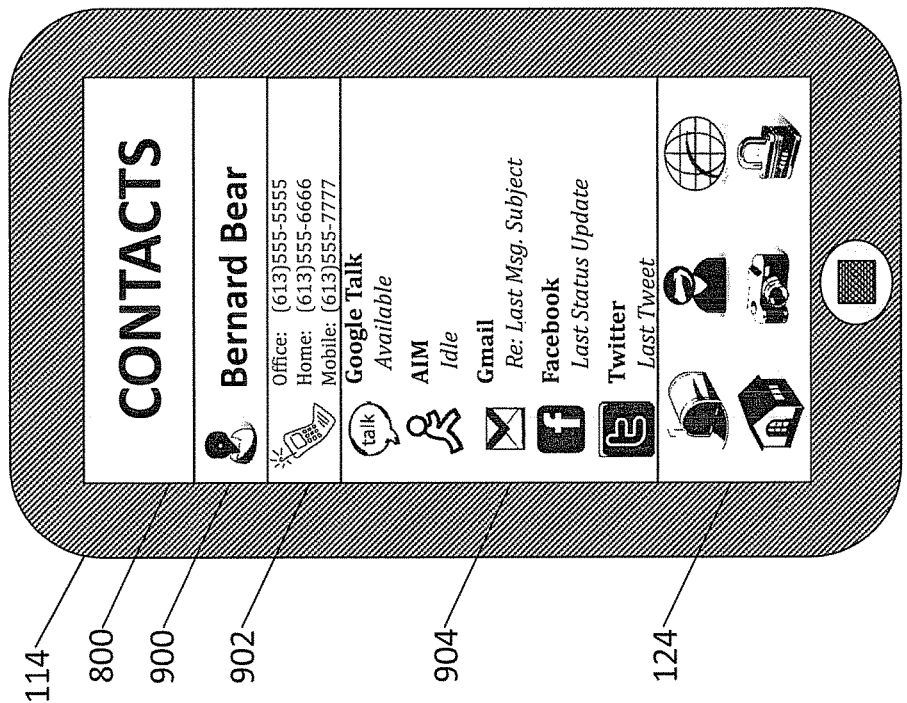
FIG. 9 is a diagram illustrating a detailed contact entry view of an exemplary GUI for managing associations between users in multiple OTT service platforms in accordance with embodiments of the subject matter described herein.

FIG. 9 is a diagram illustrating a detailed contact entry view of an exemplary GUI for managing associations between users in multiple OTT service platforms in accordance with embodiments of the subject matter described herein. Referring to FIG. 9, GUI 124 may include one or more interfaces for viewing and or managing individual contact entries. For example, GUI 124 may include detailed contact interface 900 for managing an individual contact entry, such as contact entry 802. Detailed contact interface 900 may be divided into and/or include one or more regions for presenting information to a user of UE 114. For example, detailed contact interface 900 may include voice portion 902 and OTT portion 904. Voice portion 902 may include one or more telephone numbers for contacting a user associated with a given contact entry. For example, voice portion 902 may include one or more "Office," "Home," and/or "Mobile" phone numbers for contacting a user (e.g., "Bernard Bear") associated with contact entry 802. OTT portion 904 may include information identifying a user associated with a given contact entry in one or more OTT service platforms. For example, OTT portion 904 may include information identifying a user (e.g., "Bernard Bear") associated with contact entry 802 in one or more of OTT service platform "A" 102, OTT service platform "B" 104, and/or OTT service platform "C" 106. In one embodiment, OTT portion 904 may allow a user associated with UE 114 to view relatively contemporary information associated with a contact entry that is provided by one or more OTT service platforms. For example, OTT portion 904 may allow a user associated with UE 114 to view relatively contemporary information associated with contact entry 802 that is provided by one or more of OTT service platform "A" 102, OTT service platform "B" 104, and/or OTT service platform "C" 106. For example, if OTT service platform "A" 102 corresponds to Facebook, OTT service platform "B" 104 corresponds to Twitter, and OTT service platform "C" 106 corresponds to Gmail, OTT portion 904 may display the current "status" associated with contact entry 802, the last "tweet" associated with contact entry 802, and/or the subject of the last email between a user associated with UE 114 and a user associated with contact entry 802. In one embodiment, GUI 124 may provide an interface (not illustrated) for allowing a user associated with UE 114 to create and/or alter rules that govern how information provided by one or more OTT service platforms is displayed by contact management interface 800 and/or detailed contact interface 900. For example, GUI 124 may provide an interface (not illustrated) for allowing a user associated with UE 114 to create/and or alter rules that govern how information provided by one or more of OTT service platform "A" 102, OTT service platform "B" 104, and/or OTT service platform "C" 106 is displayed by contact management interface 800 and/or detailed contact interface 900. For example, if OTT service platform "A" 102 corresponds to Facebook, OTT service platform "B" 104 corresponds to Twitter, and OTT service platform "C" 106 corresponds to Yahoo messenger, GUI 124 may provide an interface (not illustrated) for allowing a user associated with UE 114 to create one or more rules that specify that a contact picture should be obtained in the first instance from OTT service platform "A" 102 (e.g., Facebook), but if a picture is unavailable from OTT service platform "A" 102 and available from OTT service platform "B" 104 (e.g., Twitter), display such a picture.

Figure 10:
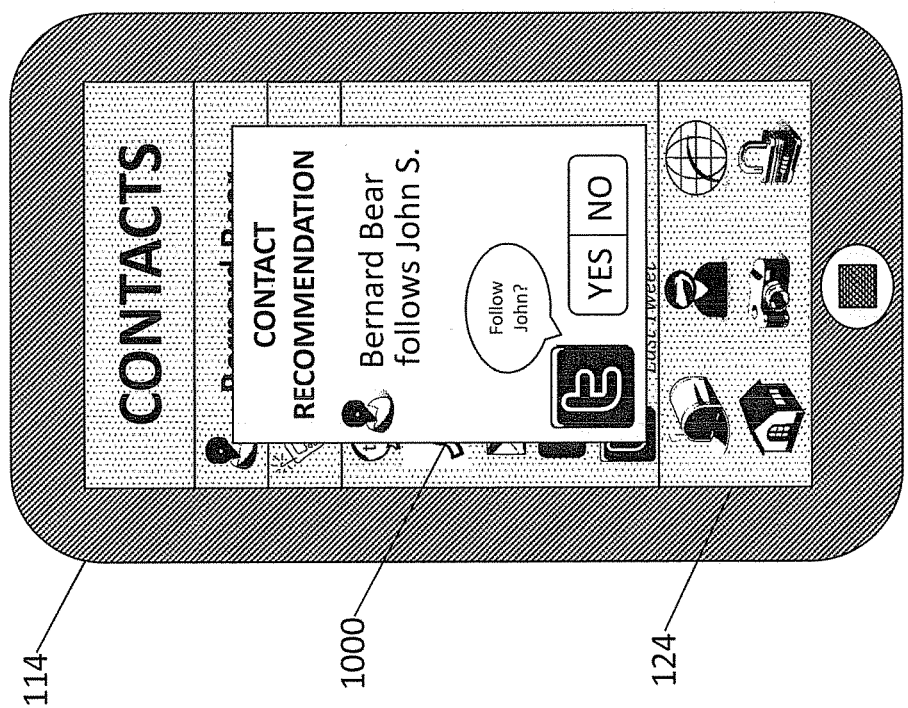
FIG. 10 is a diagram illustrating a new contact recommendation view of an exemplary GUI for managing associations between users in multiple OTT service platforms in accordance with embodiments of the subject matter described herein.

FIG. 10 is a diagram illustrating a new contact recommendation view of an exemplary GUI for managing associations between users in multiple OTT service platforms in accordance with embodiments of the subject matter described herein. In accordance with embodiments of the subject matter described herein, GUI 124 may provide a user associated with UE 114 with a recommendation interface for accepting or declining recommendations made by one or more OTT service nodes. For example, referring to FIG. 10, GUI 124 may provide a user associated with UE 114 with recommendation interface 1000 for accepting or denying recommendations made by OTT service node(s) 122. For example, user profile "X" 702 and user profile "X" 706 may be associated with a user of UE 114, user profile "Y" 704 and user profile "Y" 708 may be associated with contact entry 802 (e.g., "Bernard Bear"), and user profile "Z" 710 may be associated with a user of OTT service platform "B" 104 (e.g., "John S."). As discussed with respect to FIG. 7, association 712 may exist between user profile "X" 702 and user profile "Y" 704 in OTT service platform "A" 102 and association 714 may be created between user profile "Y" 708 and user profile "Z" 710 in OTT service platform "B" 104. For example, if OTT service platform "A" 102 corresponds to Facebook and OTT service platform "B" 104 corresponds to Twitter, a user associated with user profile "X" 702 (e.g., a user associated with UE 114) may be "friends" with a user associated with user profile "Y" 704 (e.g., "Bernard Bear"), and a user associated with user profile "Y" 708 (e.g., "Bernard Bear") may begin to "follow" a user associated with user profile "Z" 710 (e.g., "John S."). In response, OTT service node(s) 122 may, based on association 712 and the creation of association 714, recommend to a user associated with UE 114 to create association 716 between user profile "X" 706 and user profile "Z" 710 in OTT service platform "B" 104 (e.g., recommend that a user associated with UE 114, who is "friends" with "Bernard Bear," follow "John S.," a user "Bernard Bear" follows). OTT service node(s) 122 may communicate such a recommendation to UE 114 and recommendation interface 1000 may allow a user associated with UE 114 to either accept or decline the recommendation. In response to a user associated with UE 114 accepting such a recommendation, OTT service node(s) 122 may generate and/or communicate a request to the appropriate OTT service platform. For example, in response to a user associated with UE 114 accepting, via recommendation interface 1000, a recommendation from OTT service node(s) 122, to create association 716 between user profile "X" 706 and user profile "Z" 710 in OTT service platform "B" 104, OTT service node(s) 122 may generate and/or communicate a message to OTT service platform "B" 104 to create association 716 between user profile "X" 706 and user profile "Z" 710 (e.g., to have a user associated with "UE" 114 "follow" "John S." in Twitter).

Figure 11:
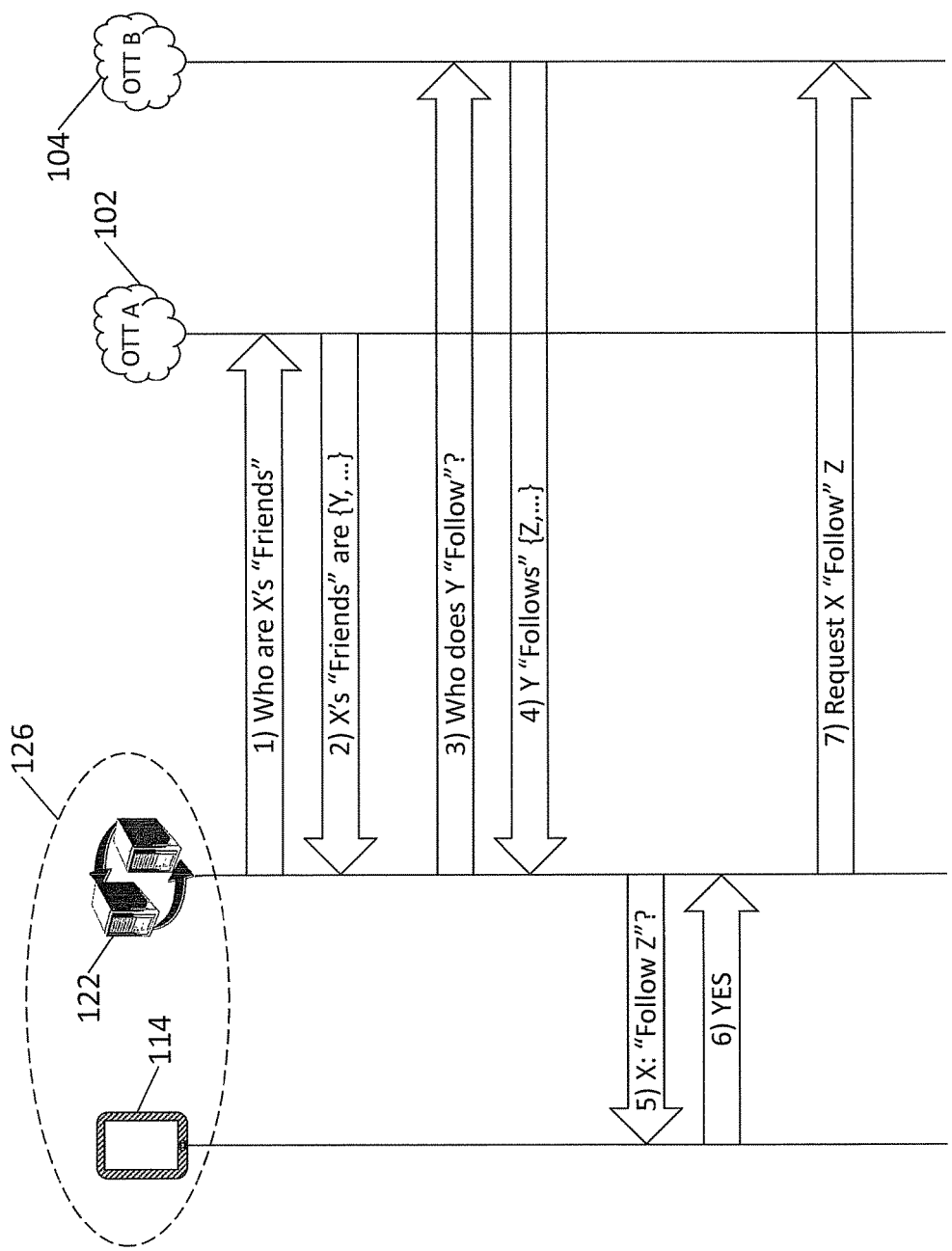
FIG. 11 is a message flow diagram illustrating an exemplary message sequence for managing associations between users in multiple OTT service platforms in accordance with embodiments of the subject matter described herein.

FIG. 11 is a message flow diagram illustrating an exemplary message sequence for managing associations between users in multiple OTT service platforms in accordance with embodiments of the subject matter described herein. Referring to FIG. 11, prior to step 1, a user associated with UE 114 may invoke a feature of UE 114 that triggers OTT service node(s) 122. For example, a user associated with UE 114 may invoke contact management interface 800. At step 1, OTT service node(s) 122 may send one or more messages to one or more OTT service platforms for extracting information. For example, if OTT service platform "A" 102 corresponds to Facebook, OTT service node(s) 122 may send a message to OTT service platform "A" 102 for extracting a list of "friends" associated with user profile "X" 702 in OTT service platform "A" 102 (e.g., a list of "friends" of a user of UE 114). Such an extraction message may invoke an application program interface (API) provided by the receiving OTT service platform. For example, if OTT service platform "A" 102 corresponds to Facebook, the message sent in step 1 from OTT service node(s) 122 to OTT service platform "A" 102 may invoke a function of an API provided by OTT service platform "A" 102 that provides a list of one or more user profiles associated with a user profile that is passed as a parameter of the API functional call. At step 2, OTT service platform "A" 102 may respond with a message that contains a list of one or more user profiles associated with user profile "X" 702. For example, OTT service platform "A" 102 may respond with a message that contains a list of user profiles associated with user profile "X" 702 in OTT service platform "A" 102 (e.g., a list of "friends" associated with a user of UE 114), and that list may include user profile "Y" 704 (e.g., "Bernard Bear"). In accordance with embodiments of the subject matter described herein, OTT service node(s) 122 may update an aggregate OTT data structure associated with UE 114 to reflect the information contained in the message received from OTT service platform "A" 102. For example, OTT service node(s) 122 may update an aggregate OTT data structure associated with UE 114 to reflect the list of user profiles (e.g., "friends") associated with user profile "X" 702 in OTT service platform "A" 102 (e.g., Facebook).

At step 3, OTT service node(s) 122 may send one or more messages to one or more OTT service platforms for extracting information. For example, if OTT service platform "B" 104 corresponds to Twitter, OTT service node(s) 122 may send a message to OTT service platform "B" 104 for extracting a list of users user profile "Y" 708 "follows" (e.g., users "Bernard Bear" "follows") in OTT service platform "B" 104. Such an extraction message may invoke an API provided by the receiving OTT service platform. For example, if OTT service platform "B" 104 corresponds to Twitter, the message sent in step 3 from OTT service node(s) 122 to OTT service platform "B" 104 may invoke a function of an API provided by OTT service platform "B" 104 that provides a list of one or more user profiles associated with a user profile that is passed as a parameter of the API functional call. At step 4, OTT service platform "B" 104 may respond with a message that contains a list of one or more user profiles associated with user profile "Y" 708. For example, OTT service platform "B" 104 may respond with a message that contains a list of user profiles associated with user profile "Y" 708 in OTT service platform "B" 104 (e.g., a list of users "Bernard Bear" "follows"), and that list may include user profile "Z" 710 (e.g., "John S."). OTT service node(s) 122 may update an aggregate OTT data structure associated with UE 114 to reflect the information contained in the message received from OTT service platform "B" 104. For example, OTT service node(s) 122 may update an aggregate OTT data structure associated with UE 114 to reflect the list of user profiles associated with user profile "Y" 708 in OTT service platform "B" 104 (e.g., users "followed" by "Bernard Bear").

In an alternate scenario (not illustrated), service node(s) 122 may be triggered by a message from one or more OTT service platforms. For example, service node(s) 122 may be triggered by a message from one or more of OTT service platform "A" 102, OTT service platform "B" 104, and/or OTT service platform "C" 106. Such a message may indicate that a new association has been created within the sending OTT service platform. Such a message may be sent in response to OTT service node(s) 122 registering to receive notifications from the sending OTT service platform when specified new associations are created within it. For example, OTT service node(s) 122 may register to receive notifications from OTT service platform "B" 104 that are related to one or more of user profile "X" 706 and user profile "Y" 708. Such a registration process may be accomplished by invoking an API provided by one or more OTT service platform. For example, OTT service node(s) 122 may invoke an API function provided by OTT service platform "B" 104, passing as a parameter a list of user profiles OTT service node(s) 122 wish to receive notifications concerning (e.g., user profile "X" 706 and user profile "Y" 708). Having received a subscription request from OTT service node(s) 122, when association 714 is created between user profile "Y" 708 and user profile "Z" 710 in OTT service platform "B" 104, OTT service platform "B" 104 may send a message to OTT service node(s) 122 indicating the creation of association 714 between user profile "Y" 708 and user profile "Z" 710 in OTT service platform "B" 104. In accordance with embodiments of the subject matter described herein, OTT service node(s) 122 may update an aggregate OTT data structure associated with UE 114 to reflect the information contained in the notification message received from OTT service platform "B" 104. For example, OTT service node(s) 122 may update an aggregate OTT data structure associated with UE 114 to reflect the creation of association 714 between user profile "Y" 708 and user profile "Z" 710 in OTT service platform "B" 104.

In accordance with embodiments of the subject matter described herein, OTT service node(s) 122 may determine, based on information stored in an aggregate OTT data structure, to recommend to a user associated with UE 114 the creation of a new association. For example, OTT service node(s) 122 may determine to recommend, based on association 712 between user profile "X" 702 and user profile "Y" 704 in OTT service platform "A" 102 (e.g., the "friendship" between a user associated with UE 114 and "Bernard Bear" in Facebook) and association 714 between user profile "Y" 708 and user profile "Z" 710 in OTT service platform "B" 104 (e.g., the fact that "Bernard Bear" "follows" "John S." in Twitter) to recommend to a user associated with UE 114 the creation of association 716 between user profile "X" 706 and user profile "Z" 710 in OTT service platform "B" 104 (e.g., to recommend that a user associated with UE 114 "follow" "John S." in Twitter). At step 5, OTT service node(s) 122 may send a message to UE 114 for recommending the creation of association 716 in OTT service platform "B" 104. In response, UE 114 may utilize recommendation interface 1000 to prompt a user associated with UE 114 about whether to accept or decline the recommendation. If a user associated with UE 114 accepts the request, at step 6, UE 114 may send a message to OTT service node(s) 122 indicating that a user associated with UE 114 has accepted the recommendation. At step 7, OTT service node(s) 122 may send a message to OTT service platform "B" 104 requesting the creation of association 716 between user profile "X" 706 and user profile "Z" 710 in OTT service platform "B" 104.

Figure 12:
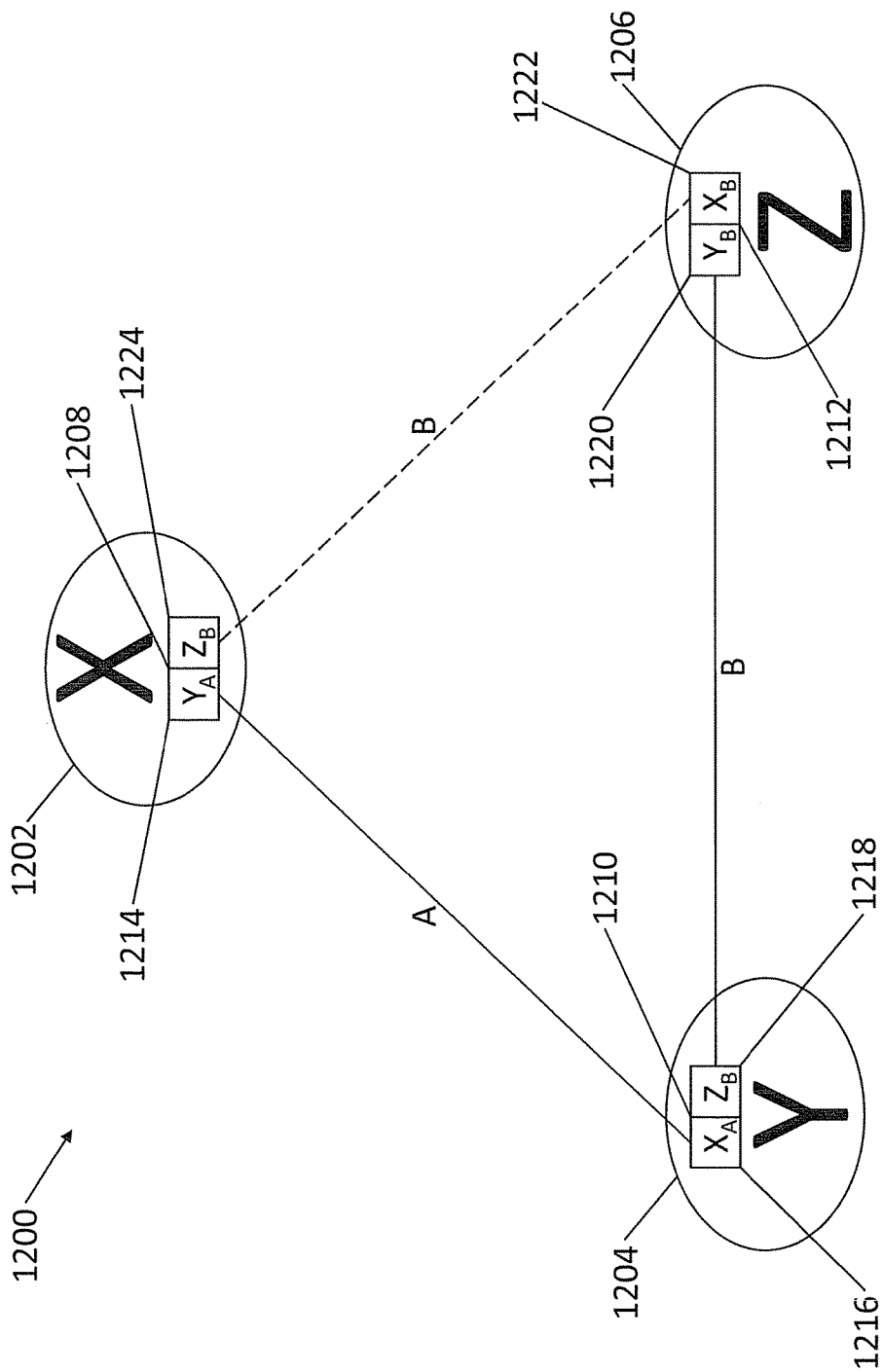
FIG. 12 is a diagram illustrating an exemplary data structure for managing associations between users in multiple OTT service platforms in accordance with embodiments of the subject matter described herein.

FIG. 12 is a diagram illustrating an exemplary data structure for managing associations between users in multiple OTT service platforms in accordance with embodiments of the subject matter described herein. Referring to FIG. 12, aggregate OTT data structure 1200 may take the form of a connected graph, with each node corresponding to a contact list entry. For example, aggregate OTT data structure 1200 may include nodes 1202, 1204, and 1206, respectively corresponding to contact entries associated with user "X" (e.g., a user of UE 114), user "Y" (e.g., "Bernard Bear"), and user "Z" (e.g., "John S"). In accordance with embodiments of the subject matter described herein, aggregate OTT data structure 1200 may include metadata describing the interrelationship between one or more users of one or more OTT service platforms. For example, each node within aggregate OTT data structure 1200 may include a list of pointers connecting it with other nodes within aggregate OTT data structure 1200. For example, within aggregate OTT data structure 1200, nodes 1202, 1204, and 1206 may each respectively include pointer lists 1208, 1210, and 1212 for connecting each of nodes 1202, 1204, and 1206 with other nodes within aggregate OTT data structure 1200. Each pointer list may include one or more entries corresponding to an association between itself and other nodes within aggregate OTT data structure 1200. Accordingly, each connected node may include a corresponding entry within its list connecting it back to the node containing the referencing pointer list entry. Each entry within such lists may correspond to an association between the users associated with the respective connecting nodes in an OTT service platform and may contain a field for identifying the OTT service platform in which the association exists. For example, pointer list 1208 may contain entry "$Y_A$" 1214 corresponding to association 712 between user profile "X" 702 and user profile "Y" 704 in OTT service platform "A" 102. Pointer list 1210 may contain a counterpart entry "$X_A$" 1216 also corresponding to association 712 between user profile "X" 702 and user profile "Y" 704 in OTT service platform "A" 102. Similarly, pointer list 1210 may contain entry "$Z_B$" 1218 corresponding to association 714 between user profile "Y" 708 and user profile "Z" 710 in OTT service platform "B" 104, and pointer list 1212 may contain a counterpart entry "$Y_B$" 1220 also corresponding to association 714 between user profile "Y" 708 and user profile "Z" 710 in OTT service platform "B" 104.

In accordance with embodiments of the subject matter described herein, OTT service node(s) 122 may traverse aggregate OTT data structure 1200 and utilize the metadata contained within aggregate OTT data structure 1200 in recommending the creation of a new association between one or more users in an OTT service platform. For example, OTT service node(s) 122 may traverse aggregate OTT data structure 1200, beginning at node 1202 (e.g., a user associated with UE 114). In examining pointer list 1208, OTT service node(s) 122 may identify from entry "$Y_A$" 1214 that association 712 exists between user profile "X" 702 and user profile "Y" 704 in OTT service platform "A" 102 (e.g., that "Bernard Bear" is "friends" with a user associated with UE 114). OTT service node(s) 122 may further traverse aggregate OTT data structure 1200, following a pointer contained in entry "$Y_A$" 1214, to node 1204 (e.g., "Bernard Bear"). In examining pointer list 1210, OTT service node(s) 122 may identify from entry "$Z_B$" 1218 that association 714 exists between user profile "Y" 708 and user profile "Z" 710 in OTT service platform "B" 104 (e.g., that "Bernard Bear" "follows" "John S"), and may recommend to a user associated with UE 114, based on the identification of associations 712 and 714, the creation of association 716 between user profile "X" 706 and user profile "Z" 710 in OTT service platform "B" 104 (e.g., recommend that a user associated with UE 114 "follow" "John S." in Twitter). A user associated with UE 114 may accept OTT service node(s) 122's recommendation, for example via recommendation interface 1000, creating association 716, and, in response, OTT service node(s) 122 may create entry "$X_B$" 1222 and entry "$Z_B$" 1224 corresponding to newly created association 716.

Figure 13:
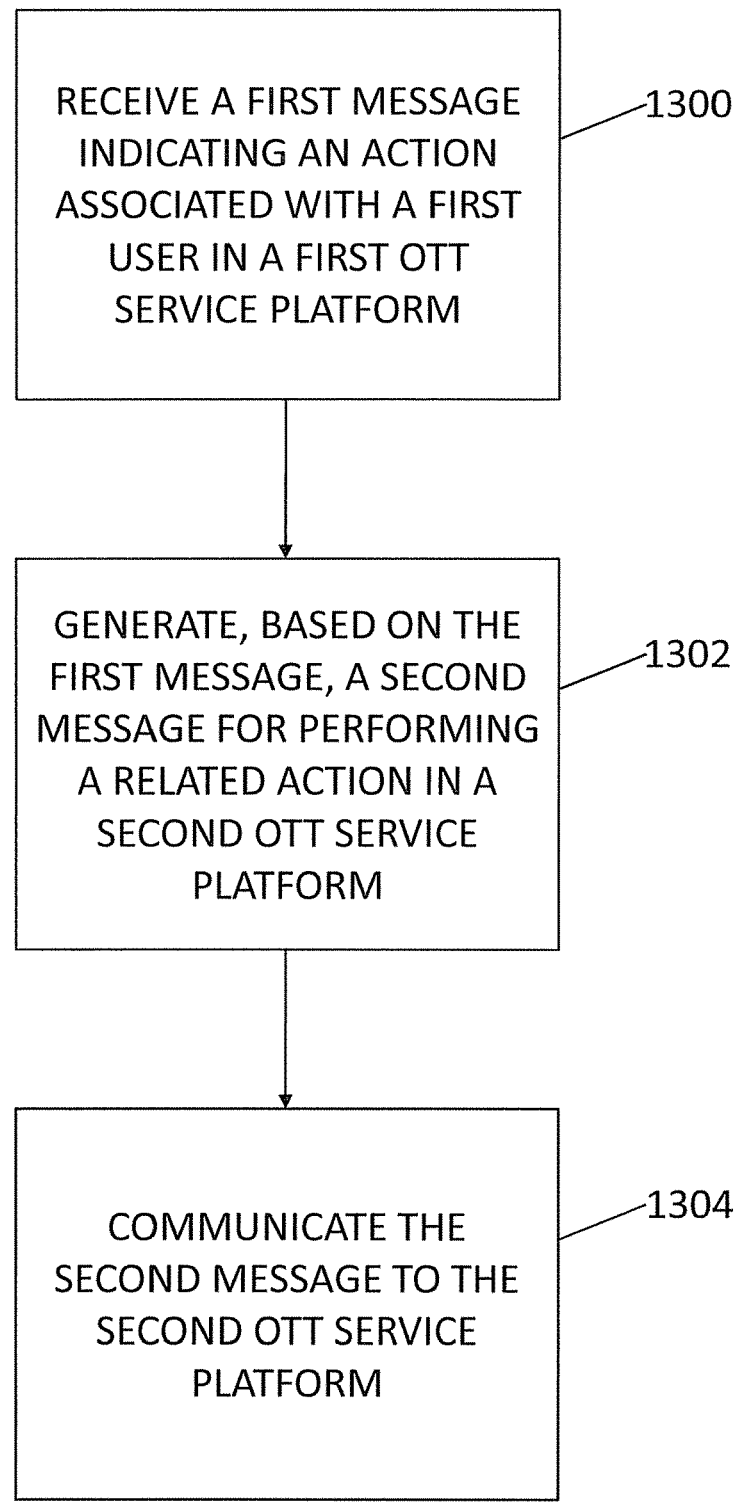
FIG. 13 is a flow chart illustrating an exemplary process for managing associations between users in multiple OTT service platforms in accordance with embodiments of the subject matter described herein.

FIG. 13 is a flow chart illustrating an exemplary process for managing associations between users in multiple OTT service platforms in accordance with embodiments of the subject matter described herein. Referring to FIG. 13, in step 1300, a first message is received indicating an action associated with a first user in a first OTT service platform. For example, OTT service node(s) 122 may receive a first message indicating that association 210 has been created between user profile "X" 202 and user profile "Y" 204 in OTT service platform "A" 102. In step 1302, a second message is generated, based on the first message, for performing a related action in a second OTT service platform. For example, OTT service node(s) 122 may generate, based on the first message, a second message for creating association 212 between user profile "X" 206 and user profile "Y" 208 in OTT service platform "B" 104. In step 1304, the second message is communicated to the second OTT service platform. For example, OTT service node(s) 122 may communicate the second message to OTT service platform "B" 104.

Figure 14:
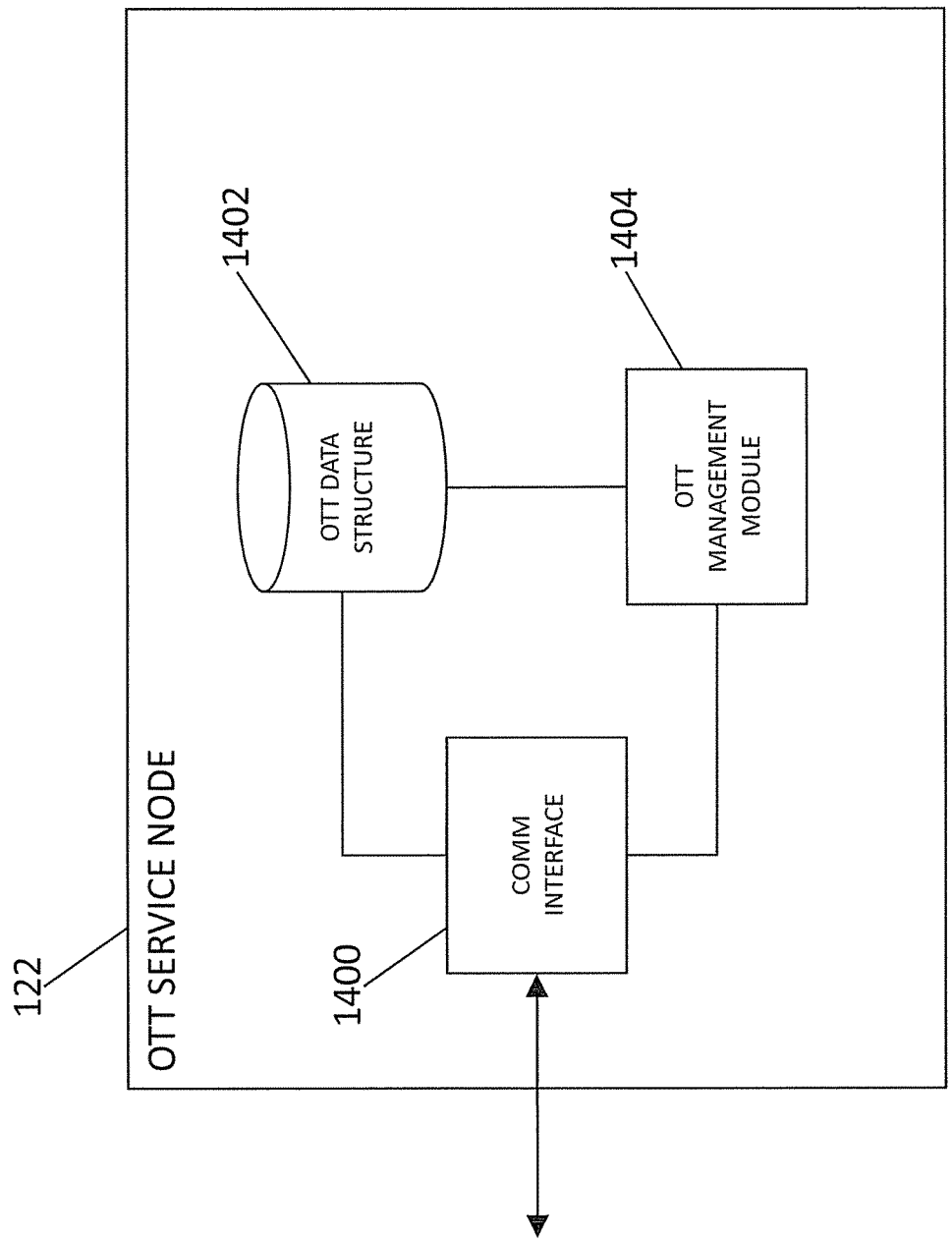
FIG. 14 is a block diagram illustrating an exemplary OTT service node for managing associations between users in multiple OTT service platforms in accordance with embodiments of the subject matter described herein.

FIG. 14 is a block diagram illustrating an exemplary OTT service node for managing associations between users in multiple OTT service platforms in accordance with embodiments of the subject matter described herein. Referring to FIG. 14, OTT service node(s) 122 may include communication interface 1400 for sending and/or receiving messages from one or more OTT service platforms. For example, OTT service node(s) 122 may utilize communication interface 1400 for sending and/or receiving messages from one or more of OTT service platform "A" 102, OTT service platform "B" 104, and/or OTT service platform "C" 106. OTT service node(s) 122 may also include memory 1402, which may be any non-transitory computer readable medium suitable for storing information about one or more users of one or more OTT service platforms. For example, memory 1402 may contain an aggregate OTT data structure having a form substantially similar to OTT data structure 1200. OTT service node(s) 122 may further include OTT management module 1404. OTT management module 1404 may be configured to receive, via communication interface 1400, a first message indicating an action associated with a first user in a first OTT service platform. For example, OTT management module 1404 may be configured to receive, via communication interface 1400, a message indicating that association 210 has been created between user profile "X" 202 and user profile "Y" 204 in OTT service platform "A" 102. OTT management module 1404 may also be configured to generate, based on the first message and information stored in memory 1402, a second message for performing a related action in a second OTT service platform. For example, OTT management module 1404 may be configured to generate, based on the first message and information stored in memory 1402, a message for creating association 212 between user profile "X" 206 and user profile "Y" 208 in OTT service platform "B" 104. OTT management module 1404 may further be configured to communicate, via communication interface 1400, the second message to the second OTT service platform. For example, OTT management module 1404 may be configured to communicate, via communication interface 1400, the second message to OTT service platform "B" 104.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:
1. A method for managing associations between users within multiple over-the-top (OTT) service platforms, the method comprising:
receiving a first message indicating an action in an OTT service platform account of a first user in a first OTT service platform of the multiple OTT service platforms;

traversing a list of users associated with the first user in at least one OTT service platform, traversing a list of users associated with a second user in at least one OTT service platform, and identifying a third user in at least one OTT service platform as being associated with a user that is also associated with the first user;

generating, based on the first message, a second message for performing a related action in an OTT service platform account in a second OTT service platform; and communicating the second message to the second OTT service platform.

2. The method of claim 1 wherein the first message comprises information indicating an association between the OTT service platform account of the first user and an OTT service platform account of the second user in the first OTT service platform and the second message comprises a request to associate an OTT service platform account of the first user in the second OTT service platform with an OTT service platform account of the second user in the second OTT service platform.

3. The method of claim 1 wherein the first message comprises information indicating destruction of an association between the OTT service platform account of the first user in the first OTT service platform and an OTT service platform account of the second user in the first OTT service platform and the second message comprises a request to disassociate an OTT service platform account of the first user with an OTT service platform account of the second user in the second OTT service platform.

4. The method of claim 1 further comprising determining that the OTT service platform account of the first user in the first OTT service platform is associated with an OTT service platform account of the second user in the first OTT service platform and that an OTT service platform account of the second user in the second OTT service platform is associated with an OTT service platform account of the third user in the second OTT service platform.

5. The method of claim 4 wherein the second message comprises a request to associate the first user with the third user.

6. The method of claim 5 wherein the request is to associate the OTT service platform account of the first user in the first OTT platform with an OTT service platform account of the third user in the first OTT service platform.

7. The method of claim 5 wherein the request is to associate the OTT service platform account of the first user in the second OTT platform with the OTT service platform account of the third user in the second OTT service platform.

8. The method of claim 4 further comprising determining that the first user and the third user each utilize an OTT service platform account in a third OTT service platform and generating a third message comprising a request to associate the OTT service platform account of the first user in the third OTT service platform with the OTT service platform account of the third user in the third OTT service platform.

9. The method of claim 8 comprising updating an aggregate OTT data structure to reflect performance of the action in the OTT service platform account of the first user in the first OTT service platform.

10. The method of claim 9 wherein the aggregate OTT data structure comprises metadata describing an interrelationship between at least a portion of OTT service platform accounts of users of the first OTT service platform and at least a portion of OTT service platform accounts of users of the second OTT service platform.

11. The method of 10 wherein the determining that the OTT service platform account of the first user in the first OTT service platform is associated with the OTT service platform account of the second user in the first OTT service platform and that the OTT service platform account of the second user in the second OTT service platform is associated with the OTT service platform account of the third user in the second OTT service platform is based on the metadata.

12. The method of claim 10 wherein the metadata is based on information extracted from user accounts in the first OTT service platform and user accounts in the second OTT service platform.

13. The method of claim 12 wherein the information is extracted via application program interfaces (APIs) provided by the first OTT service platform and the second OTT service platform.

14. The method of claim 12 wherein the extracted information comprises:

the list of users associated with the first user in at least one OTT service platform, comprising a list of users associated with the first user in the first OTT service platform; and the list of users associated with the second user in at least one OTT service platform, comprising a list of users associated with the second user in the second OTT service platform; and wherein the list of users associated with the first user in the first OTT service platform includes information corresponding to the second user and the list of users associated with the second user in the second OTT service platform includes information corresponding to the third user.

15. The method of claim 14 wherein traversing the lists of users comprises traversing the list of users associated with the first user in the first OTT service platform, traversing the list of users associated with the second user in the second OTT service platform, and identifying the third user as being associated with some user that is also associated with the first user, to determine that the first user is associated with the second user in the first OTT service platform and that the second user is associated with the third user in the second OTT service platform.

16. The method of claim 1 further comprising determining that the OTT service platform account of the first user in the first OTT service platform is associated with an OTT service platform account of the second user in the first OTT service platform, determining that the OTT service platform account of the second user in the first OTT service platform is associated with an OTT service platform account of the third user in the first OTT service platform, and determining that both the first user and the third user utilize an OTT service platform account in the second OTT service platform.

17. The method of claim 16 wherein the second message comprises a request to associate an OTT service platform account of the first user in the second OTT service platform with the OTT service platform account of the third user in the second OTT service platform.

18. The method of claim 1 comprising updating an entry in a contact list, wherein the contact list is associated with the first user and the entry updated is associated with the second user.

19. The method of claim 18 wherein the entry includes fields for identifying the second user, contacting the second user in a telephone network, and identifying an OTT service platform account of the second user in at least one OTT service platform.

20. The method of claim 19 wherein at least two of the fields contain information extracted from user accounts in OTT service platforms, the information identifying OTT service platform accounts of the second user in the OTT service platforms from which the information was extracted.

21. The method of claim 18 wherein the contact list is operatively associated with a contact management graphical user interface (GUI) for managing entries in the contact list.

22. The method of claim 21 wherein a copy of the contact list is stored on a network node which displays the contact management GUI.

23. The method of claim 21 wherein a copy of the contact list is stored on a first network node and the contact management GUI is displayed on a second network node distinct from the first network node.

24. The method of claim 18 wherein the second message is generated in response to the first user accepting, via the GUI, a recommendation to perform the related action in the OTT service platform account in the second OTT service platform.

25. The method of claim 18 wherein the GUI displays entries in the contact list according to user-defined rules.

26. The method of claim 25 wherein at least one of the rules specifies a preference for displaying information from at least one of the first OTT service platform and the second OTT service platform.

27. The method of claim 1, further comprising determining that the first user is associated with the second user in the second OTT service platform by determining that the OTT service platform account of the first user is associated with a OTT service platform account of a third user in the first OTT service platform and that an OTT service platform account of the third user in the second OTT service platform is associated with the OTT service platform account of the second user in the second OTT service platform.

28. A system for managing associations between over-the-top (OTT) service platform accounts of users within multiple OTT service platforms, the system comprising:
a communication interface;
a memory; and
an OTT management module configured to:
receive, via the communication interface, a first message indicating an action in an OTT service platform account of a first user in a first OTT service platform of the multiple OTT service platforms;
determine that the first user is associated with a second user in at least one OTT service platform and that the second user is associated with a third user in at least one OTT service platform, by at least traversing a list of users associated with the first user in at least one OTT service platform, traversing a list of users associated with the second user in at least one OTT service platform, and identifying the third user as being associated with some user that is also associated with the first user;
generate, based on the first message and information stored in the memory, a second message for performing a related action an OTT service platform account in a second OTT service platform; and
communicate, via the communication interface, the second message to the second OTT service platform.

29. The system of claim 28 wherein the first message comprises information indicating an association between the OTT service platform account of the first user and an OTT service platform account of the second user in the first OTT service platform and the second message comprises a request to associate an OTT service platform account of the first user in the second OTT service platform with an OTT service platform account of the second user in the second OTT service platform.

30. The system of claim 28 wherein the first message comprises information indicating destruction of an association between the OTT service platform account of the first user in the first OTT service platform and an OTT service platform account of the second user in the first OTT service platform and the second message comprises a request to disassociate an OTT service platform account of the first user with an OTT service platform account of the second user in the second OTT service platform.

31. The system of claim 28 wherein the OTT management module is configured to determine that the an OTT service platform account of the first user in the first OTT service platform is associated with an OTT service platform account of the second user in the first OTT service platform and that an OTT service platform account of the second user in the second OTT service platform is associated with an OTT service platform account of the third user in the second OTT service platform.

32. The system of claim 31 wherein the second message comprises a request to associate the first user with the third user.

33. The system of claim 32 wherein the request is to associate the OTT service platform account of the first user in the first OTT platform with an OTT service platform account of the third user in the first OTT service platform.

34. The system of claim 32 wherein the request is to associate the OTT service platform account of the first user in the second OTT platform with the OTT service platform account of the third user in the second OTT service platform.

35. The system of claim 31 wherein the OTT management module is configured to determine that the first user and the third user each utilize an OTT service platform account in a third OTT service platform and generate a third message comprising a request to associate the OTT service platform account of the first user in the third OTT service platform with the OTT service platform account of the third user in the third OTT service platform.

36. The system of claim 31 wherein the OTT management module is configured to update an aggregate OTT data structure, stored in the memory, to reflect performance of the action in the OTT service platform account of the first user in the first OTT service platform.

37. The system of claim 36 wherein the aggregate OTT data structure comprises metadata describing an interrelationship between at least a portion of OTT service platform accounts of users of the first OTT service platform and at least a portion of OTT service platform accounts of users of the second OTT service platform.

38. The system of 37 wherein the OTT management module is configured to determine that the OTT service platform account of the first user in the first OTT service platform is associated with the OTT service platform account of the second user in the first OTT service platform and that the OTT service platform account of the second user in the second OTT service platform is associated with the OTT service platform account of the third user in the second OTT service platform based on the metadata.

39. The system of claim 37 wherein the metadata is based on information extracted from user accounts in the first OTT service platform and user accounts in the second OTT service platform.

40. The system of claim 39 wherein the information is extracted via application program interfaces (APIs) provided by the first OTT service platform and the second OTT service platform.

41. The system of claim 39 wherein the extracted information comprises:
the list of users associated with the first user in at least one OTT service platform, comprising a list of users associated with the first user in the first OTT service platform; and
the list of users associated with the second user in at least one OTT service platform, comprising a list of users associated with the second user in the second OTT service platform; and
wherein the list of users associated with the first user in the first OTT service platform includes information corresponding to the second user and the list of users associated with the second user in the second OTT service platform includes information corresponding to the third user.

42. The system of claim 41 wherein determining that the first user is associated with a second user further comprises determine that the first user is associated with the second user in the first OTT service platform and that the second user is associated with the third user in the second OTT service platform and traversing the list of users further comprises traversing the list of users associated with the first user in the first OTT service platform, traversing the list of users associated with the second user in the second OTT service platform, and identifying the third user as being associated with some user that is also associated with the first user.

43. The system of claim 28 wherein the OTT management module is configured to determine that the OTT service platform account of first user in the first OTT service platform is associated with an OTT service platform account of the second user in the first OTT service platform, that the OTT service platform account of the second user in the first OTT service platform is associated with an OTT service platform account of the third user in the first OTT service platform, and that both the first user and the third user utilize an OTT service platform account in the second OTT service platform.

44. The system of claim 43 wherein the second message comprises a request to associate an OTT service platform account of the first user in the second OTT service platform with the OTT service platform account of the third user in the second OTT service platform.

45. The system of claim 28 wherein the OTT management module is configured to update an entry in a contact list, wherein the contact list is associated with the first user and the entry updated is associated with the second user.

46. The system of claim 45 wherein the entry includes fields for identifying the second user, contacting the second user in a telephone network, and identifying an OTT service platform account of the second user in at least one OTT service platform.

47. The system of claim 46 wherein at least two of the fields contain information extracted from user accounts in OTT service platforms, the information identifying OTT service platform accounts of the second user in the OTT service platforms from which the information was extracted.

48. The system of claim 45 wherein the contact list is operatively associated with a contact management graphical user interface (GUI) for managing entries in the contact list.

49. The system of claim 48 wherein a copy of the contact list is stored on a network node which displays the contact management GUI.

50. The system of claim 48 wherein a copy of the contact list is stored on a first network node and the contact management GUI is displayed on a second network node distinct from the first network node.

51. The system of claim 45 wherein the OTT management module is configured to generate the second message in response to the first user accepting, via the GUI, a recommendation to perform the related action in the OTT service platform account in the second OTT service platform.

52. The system of claim 45 wherein the GUI displays entries in the contact list according to user-defined rules.

53. The system of claim 52 wherein at least one of the rules specifies a preference for displaying information from at least one of the first OTT service platform and the second OTT service platform.

54. A non-transitory computer readable medium comprising computer executable instructions that when executed by a processor of a computer control the computer to perform steps comprising:
receiving a first message indicating an action in an OTT service platform account of a first user in a first OTT service platform;
traversing a list of users associated with the first user in at least one OTT service platform, traversing a list of users associated with a second user in at least one OTT service platform, and identifying a third user in at least one OTT service platform as being associated with some user that is also associated with the first user;
generating, based on the first message, a second message for performing a related action in an OTT service platform account in a second OTT service platform; and
communicating the second message to the second OTT service platform.

* * * * *